United States Patent
Reissner

(10) Patent No.: US 9,043,573 B2
(45) Date of Patent: May 26, 2015

(54) SYSTEM AND METHOD FOR DETERMINING A LEVEL OF SUCCESS OF OPERATIONS ON AN ABSTRACTION OF MULTIPLE LOGICAL DATA STORAGE CONTAINERS

(75) Inventor: Michael Reissner, Vancouver (CA)

(73) Assignee: NetApp, Inc., Sunnyvale, CA (US)

( * ) Notice: Subject to any disclaimer, the term of this patent is extended or adjusted under 35 U.S.C. 154(b) by 148 days.

(21) Appl. No.: 13/490,925

(22) Filed: Jun. 7, 2012

(65) Prior Publication Data

US 2013/0332694 A1 Dec. 12, 2013

(51) Int. Cl.
*G06F 12/00* (2006.01)
*G06F 3/06* (2006.01)

(52) U.S. Cl.
CPC ............ *G06F 3/0644* (2013.01); *G06F 3/0683* (2013.01); *G06F 3/0614* (2013.01)

(58) Field of Classification Search
CPC ........................... G06F 12/023; G06F 12/0653
USPC .................................................. 711/170, 172
See application file for complete search history.

(56) References Cited

U.S. PATENT DOCUMENTS

| | | | |
|---|---|---|---|
| 5,500,940 A * | 3/1996 | Skeie .............................. | 714/25 |
| 6,801,937 B1 * | 10/2004 | Novaes et al. ................. | 709/220 |
| 7,937,453 B1 * | 5/2011 | Hayden et al. ................. | 709/219 |
| 2002/0120763 A1 * | 8/2002 | Miloushev et al. ........... | 709/230 |
| 2004/0088142 A1 * | 5/2004 | Ashley et al. ................. | 702/184 |
| 2006/0031606 A1 * | 2/2006 | Isobe et al. ...................... | 710/38 |
| 2007/0100712 A1 * | 5/2007 | Kilpatrick et al. .............. | 705/29 |
| 2008/0077825 A1 * | 3/2008 | Bello et al. ....................... | 714/54 |
| 2008/0196107 A1 * | 8/2008 | Yip et al. ......................... | 726/27 |
| 2010/0023814 A1 * | 1/2010 | Sundrani et al. ................ | 714/55 |
| 2010/0115063 A1 * | 5/2010 | Gladwin et al. ............... | 709/219 |
| 2010/0257137 A1 * | 10/2010 | Escribano Bullon et al. | 707/623 |
| 2011/0261838 A1 * | 10/2011 | Baptist et al. ................. | 370/474 |

* cited by examiner

*Primary Examiner* — Reginald Bragdon
*Assistant Examiner* — Michael Westbrook
(74) *Attorney, Agent, or Firm* — Mahamedi Paradice LLP

(57) ABSTRACT

Various systems and methods are described for configuring a logical data storage container. In one embodiment, an instruction to perform an operation to modify an attribute of the logical data storage container that is an abstraction of a plurality of pertinent storage containers is received. A translated instruction to perform a sub-operation associated with the operation is transmitted to each of a number of the plurality of pertinent storage containers. A level of success of the performing of the operation on the logical data storage container is detected based on a comparison of a threshold value to a level of success of the performing of the sub-operation on each of the number of the plurality of pertinent storage containers. A report of the detected level of success is communicated.

18 Claims, 9 Drawing Sheets

SYSTEM AND METHOD FOR DETERMINING A LEVEL OF SUCCESS OF OPERATIONS ON AN ABSTRACTION OF MULTIPLE LOGICAL DATA STORAGE CONTAINERS

FIELD

The present disclosure relates generally to configuring a data storage system, and, more specifically, to configuring a logical data storage container that is an abstraction of multiple underlying logical data storage containers.

BACKGROUND

Typically, when a data storage system processes a request to configure a logical data storage container (e.g., a virtual volume) of a data storage system, the data storage system processes the command as an atomic operation. Thus, the data storage system either processes the request completely or not at all. The data storage system may then provide the user with a notification of the success or failure of the processing. Additionally, in the case of a failure of the processing, the data storage system may then backout any steps that were performed during the processing to restore the data storage system to a stable, pre-request-processing state.

However, when the logical data storage container is an abstraction of multiple logical data storage containers (e.g., when a virtual volume is exposed to a user as a single volume, but the virtual volume is an abstraction of multiple underlying virtual volumes), situations may arise in which the processing of a request with respect to the logical data storage container may not be performed as an atomic operation. In these situations, it may not be clear whether a command is processed successfully. Additionally, it may not be clear how to backout any steps that were performed during the operation to restore the data storage system to a stable, pre-request-processing state.

For example, if a command to increase the size of a logical data storage container is processed successfully with respect to a first underlying logical data storage container, but the command is not processed successfully with respect to a second underlying logical data storage container, the data storage system may need to make a determination whether the processing of the command was a success or a failure with respect to a logical storage container that is an abstraction of the first underlying logical data storage container and the second underlying data storage container. Additionally, in the case of the failure of the processing, the data storage system may need to make a determination whether to backout steps performed on one or more of the underlying data storage containers.

SUMMARY

Embodiments of the present invention provide various techniques to process commands with respect to a logical storage container that is an abstraction of multiple underlying data storage containers. The underlying data storage containers may themselves also be logical data storage containers (e.g., there may an arbitrary complex graph of indirection in the relationships between the data storage containers). A request to configure the logical data storage container is received. Based on a determination that the logical data storage container is the abstraction of multiple underlying data storage containers, the request is handled by a redirector module.

The redirector module transforms the received command to a set of subordinate commands sets. The redirector module then issues the subordinate command sets to selected pertinent storage containers for execution. Here, for example, the pertinent storage containers may be additional logical or physical data storage containers that are underlying storage containers of the logical data storage container or are otherwise associated with or comprise the logical data storage container. The redirector module may determine whether the command for configuring the logical data storage container was processed successfully based on a number of sets of subordinate commands that were completed successfully on the one or more pertinent storage containers transgressing an additional threshold (e.g., a major threshold) value. If the command for configuring a subordinate data storage container was not processed successfully, the redirector module may not backout any of the sets of commands that were completed successfully on the one or more pertinent storage containers. Instead, the invoking library may send a notification of the status of the processing of the command with respect to the logical data storage container and information about additional commands that may be executed (e.g., manually by a user) to complete the requested configuration of the logical data storage container.

The redirector module determines whether a subordinate command set is processed successfully on a pertinent underlying data storage container based on a number of the subordinate commands that are processed successfully on the pertinent storage container transgressing a threshold (e.g., a minor threshold) value. If a command set is not completed successfully with respect to the pertinent storage container, the redirector module may issue an additional subordinate command set to the pertinent storage container to backout the command or each of the set of commands, thus restoring the pertinent storage container to a stable, pre-command-processing state.

BRIEF DESCRIPTION OF DRAWINGS

The present disclosure is illustrated by way of example and not limitation in the figures of the accompanying drawings, in which like references indicate similar elements and in which.

DESCRIPTION OF EXAMPLE EMBODIMENTS

The description that follows includes illustrative systems, methods, techniques, instruction sequences, and computing machine program products that embody the present invention. In the following description, for purposes of explanation, numerous specific details are set forth in order to provide an understanding of various embodiments of the inventive subject matter. It will be evident, however, to one skilled in the art that embodiments of the inventive subject matter may be practiced without these specific details. In general, well-known instruction instances, protocols, structures and techniques have not been shown in detail. Furthermore, the term "exemplary" is construed merely to mean an example of something or an exemplar and not necessarily a preferred or ideal means of accomplishing a goal.

Figure 1:
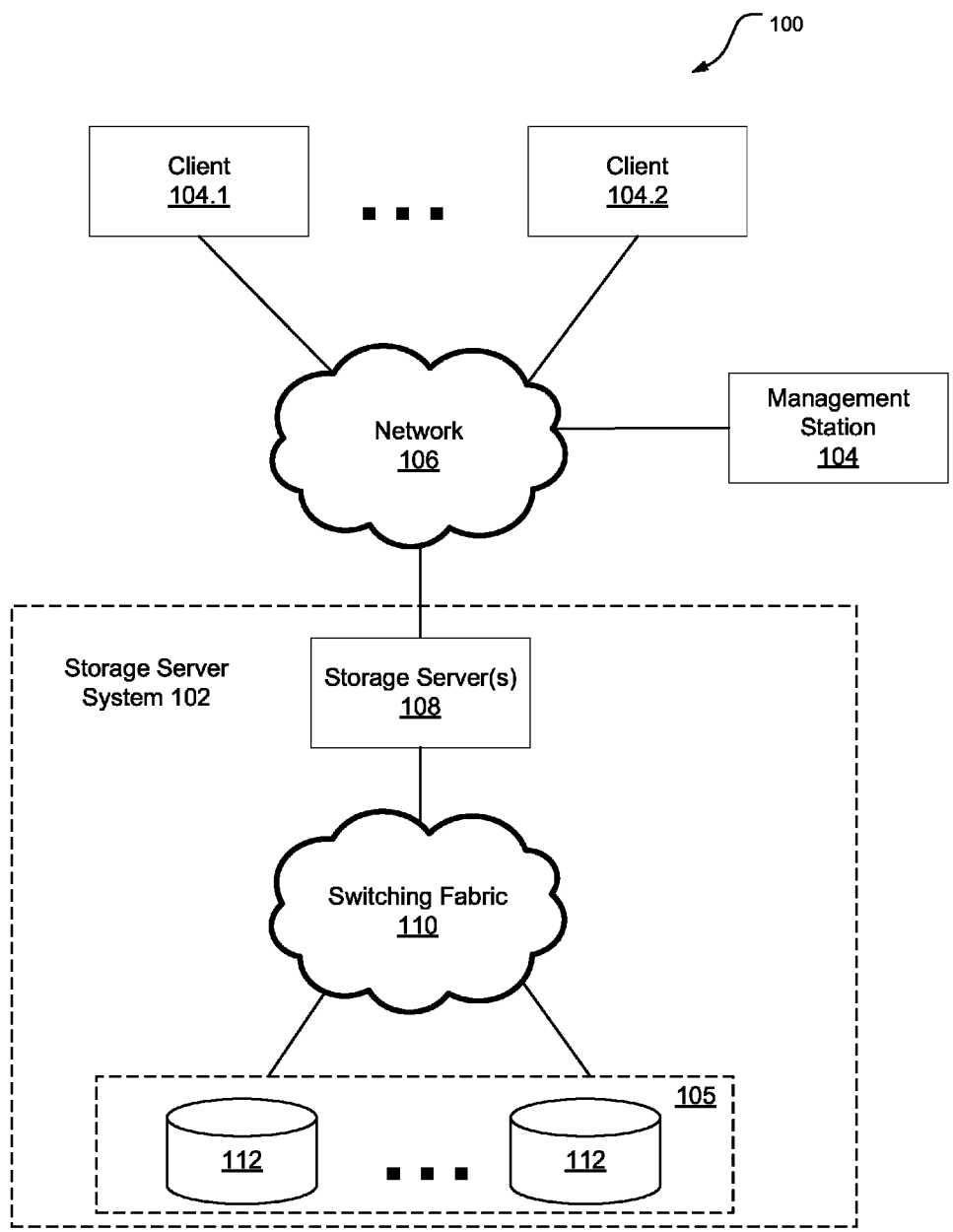
FIGS. 1 and 2 are block diagrams depicting, at different levels of detail, a network configuration in which the various embodiments of the present invention can be implemented.
Figure 2:
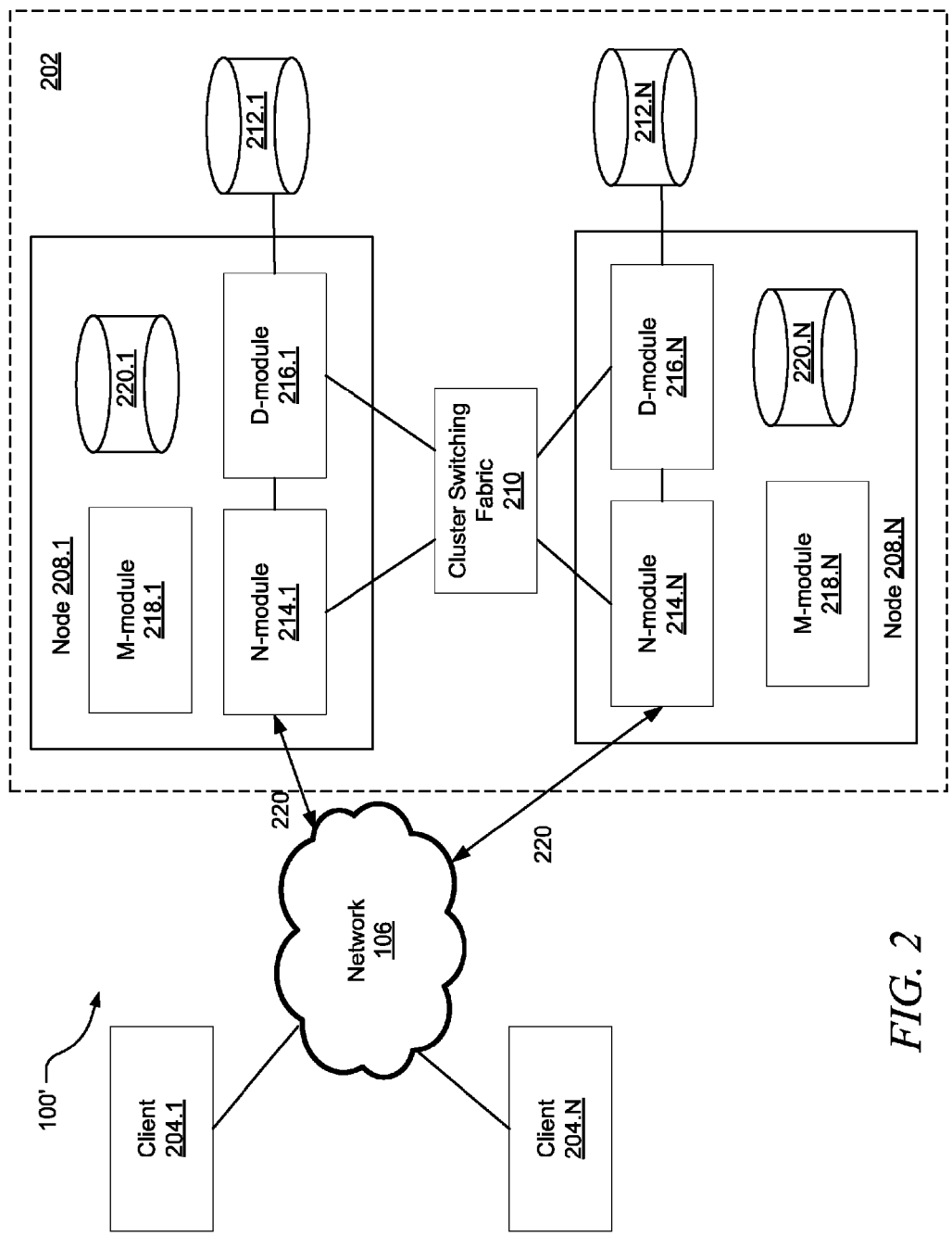

FIGS. 1 and 2 are block diagrams depicting, at different levels of detail, a network configuration in which the various embodiments of the present invention can be implemented. In particular, FIG. 1 is a block diagram depicting a network data storage environment 100, which includes client systems 104.1-104.2, a storage server system 102, and a computer network 106 connecting the client systems 104.1-104.2 and the storage server system 102. The storage server system 102 includes at least one storage server 108, a switching fabric 110, and a number of storage devices 112 in a mass storage subsystem 105. Examples of some or all of the storage devices 112 include hard drives, flash memories, solid-state drives (SSDs), tape storage, and other storage devices.

The storage server (or servers) 108 may be, for example, one of the FAS-xxx family of storage server products available from NETAPP, INC. located in Sunnyvale, Calif. The client systems 104.1-104.2 are connected to the storage server 108 via the computer network 106, which can be a packet-switched network, for example, a local area network (LAN) or wide area network (WAN). Further, the storage server 108 is connected to the storage devices 112 via a switching fabric 110, an example of which can be a fiber distributed data interface (FDDI) network. It is noted that, within the network data storage environment 100, any other suitable numbers of storage servers and/or storage devices, and/or any other suitable network technologies, may be employed. While FIG. 1 implies, in some embodiments, a fully connected switching fabric 110 where storage servers 100 can access all storage devices 112, it is understood that such a connected topology is not required. In some embodiments, the storage devices 112 can be directly connected to the storage servers 108.

The storage server 108 can make some or all of the storage space on the storage devices 112 available to the client systems 104.1-104.2. For example, each storage device 112 can be implemented as an individual disk, multiple disks (e.g., a RAID group) or any other suitable mass storage device(s). The storage server 108 can communicate with the client systems 104.1-104.2 according to well-known protocols, such as the Network File System (NFS) protocol or the Common Internet File System (CIFS) protocol, to make data stored on the storage devices 112 available to users and/or application programs. The storage server 108 can present or export data stored on the storage devices 112 as logical data containers to each of the client systems 104.1-104.2. As used herein, a "logical data container" is an abstraction of physical storage, combining one or more physical storage devices or parts thereof into a single logical storage object, and which is managed as a single administrative unit, such as a single file system. A volume and a logical unit, which is identifiable by logical unit number (LUN), are examples of logical data containers. A "file system" is a structured (e.g., hierarchical) set of stored logical data containers (e.g., volumes, LUNs, directories, data objects (e.g., files)). As illustrated below, it should be appreciated that a "file system" does not have to include or be based on "files" per se as its units of data storage.

In addition, various functions and configuration settings of the storage server 108 and the mass storage subsystem 105 can be controlled from a management station 106 coupled to the network 106. Among many other operations, operations related to identification of data objects stored on clustered logical data containers can be initiated from the management station 106.

FIG. 2 is a block diagram depicting a more detailed view of the network data storage environment 100 described in FIG. 1. The network data storage environment 100' includes a plurality of client systems 204 (204.1-204.N), a clustered storage server system 202, and a computer network 106 connecting the client systems 204 and the clustered storage server system 202. As depicted, the clustered storage server system 202 includes server nodes 208 (208.1-208.N), a cluster switching fabric 210, and storage devices 212 (212.1-212.N).

Each of the nodes 208 can be configured to include several modules, including a networking module ("N-module") 214, a data module ("D-module") 216, a management module ("M-module") 218 (each of which can be implemented by using a separate software module), and an instance of a replicated database (RDB) 220. Specifically, node 208.1 includes an N-module 214.1, a D-module 216.1, and an M-module 218.1. Node 208.N includes an N-module 214.N, a D-module 216.N, and an M-module 218.N. The N-modules 214.1-214.M include functionalities that enable nodes 208.1-208.N, respectively, to connect to one or more of the client systems 204 over the network 206. The D-modules 216.1-216.N provide access to the data stored on the storage devices 212.1-212.N, respectively. The M-modules 218 provide management functions for the clustered storage server system 202. Accordingly, each of the server nodes 208 in the clustered storage server arrangement provides the functionality of a storage server.

The RDB 220 is a database that is replicated throughout the cluster, (e.g., each node 208 includes an instance of the RDB 220). The various instances of the RDB 220 are updated regularly to bring them into synchronization with each other. The RDB 220 provides cluster-wide storage of various information used by all of the nodes 208, including a volume location database (VLDB) (not shown). The VLDB is a database that indicates the location within the cluster of each logical data container in the cluster (e.g., the owning D-module 216 for each volume), and is used by the N-modules 214 to identify the appropriate D-module 216 for any given logical data container to which access is requested.

The nodes 208 are interconnected by a cluster switching fabric 210, which can be embodied as a Gigabit Ethernet switch, for example. The N-modules 214 and D-modules 216 cooperate to provide a highly-scalable, distributed storage system architecture of a clustered computing environment implementing exemplary embodiments of the present invention. Note that while there is shown an equal number of N-modules 214 and D-modules 216 in FIG. 2, there may be differing numbers of N-modules 214 and/or D-modules 216 in accordance with various embodiments of the technique described herein. For example, there need not be a one-to-one correspondence between the N-modules 214 and D-modules 216. As such, the description of a node 208 comprising one N-module 214 and one D-module 216 should be understood to be illustrative only.

Figure 3:
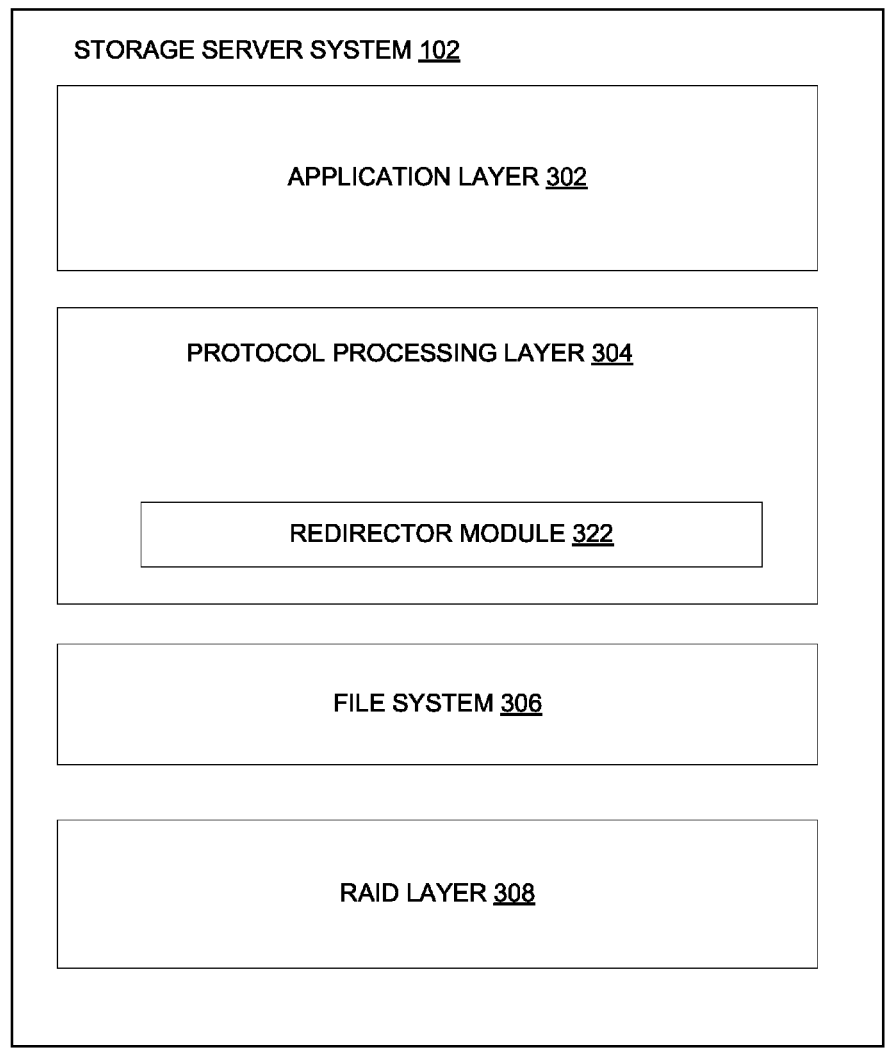
FIG. 3 is a simplified architectural diagram of a storage server system, in accordance with an exemplary embodiment, for identifying data objects stored in clustered logical data containers.

FIG. 3 is a simplified architectural diagram of a storage server system 102, in accordance with an exemplary embodiment, for identifying data objects stored in clustered logical data containers. The storage server system 102 supports a variety of layers 302, 304, 306, and 308 organized to form a multi-protocol engine that provides data paths for clients to access data stored in storage devices. The Redundant Array of Independent Disks (RAID) layer 308 provides the interface to RAID controllers, which distribute data over several storage devices. The file system layer (or file system) 306 forms an intermediate layer between storage devices and applications. It should be appreciated that storage devices are block-oriented storage medias and the file system 306 is configured to manage the blocks used by the storage devices. The file system 306 provides clients access to data objects organized in blocks by way of example directories and files.

The protocol processing layer 304 provides the protocols used to transmit stored data objects, such as Internet Small Computer System Interface (iSCSI), Network File System (NFS), and Common Internet File System (CIFS). In one exemplary embodiment, the protocol processing layer 304 includes a redirector module 322. As explained in detail below, the redirector module 322 is configured to provide indirection between directory entries and storage locations of stored data objects. Additionally included is an application layer 302 that interfaces to and performs common application services for application processes.

It should be appreciated that in other embodiments, the storage server system 102 may include fewer or more modules apart from those shown in FIG. 3. For example, in an alternate embodiment, the redirector module 322 can be further separated into two or more modules. The module 322 may be in the form of software that is processed by a processor. In another example, as explained in more detail below, the module 322 may be in the form of firmware that is processed by application specific integrated circuits (ASIC), which may be integrated into a circuit board. Alternatively, the module 322 may be in the form of one or more logic blocks included in a programmable logic device (for example, a field programmable gate array). The described module 322 may be adapted, and/or additional structures may be provided, to provide alternative or additional functionalities beyond those specifically discussed in reference to FIG. 3. Examples of such alternative or additional functionalities will be discussed in reference to the flow diagrams discussed below.

Figure 4:
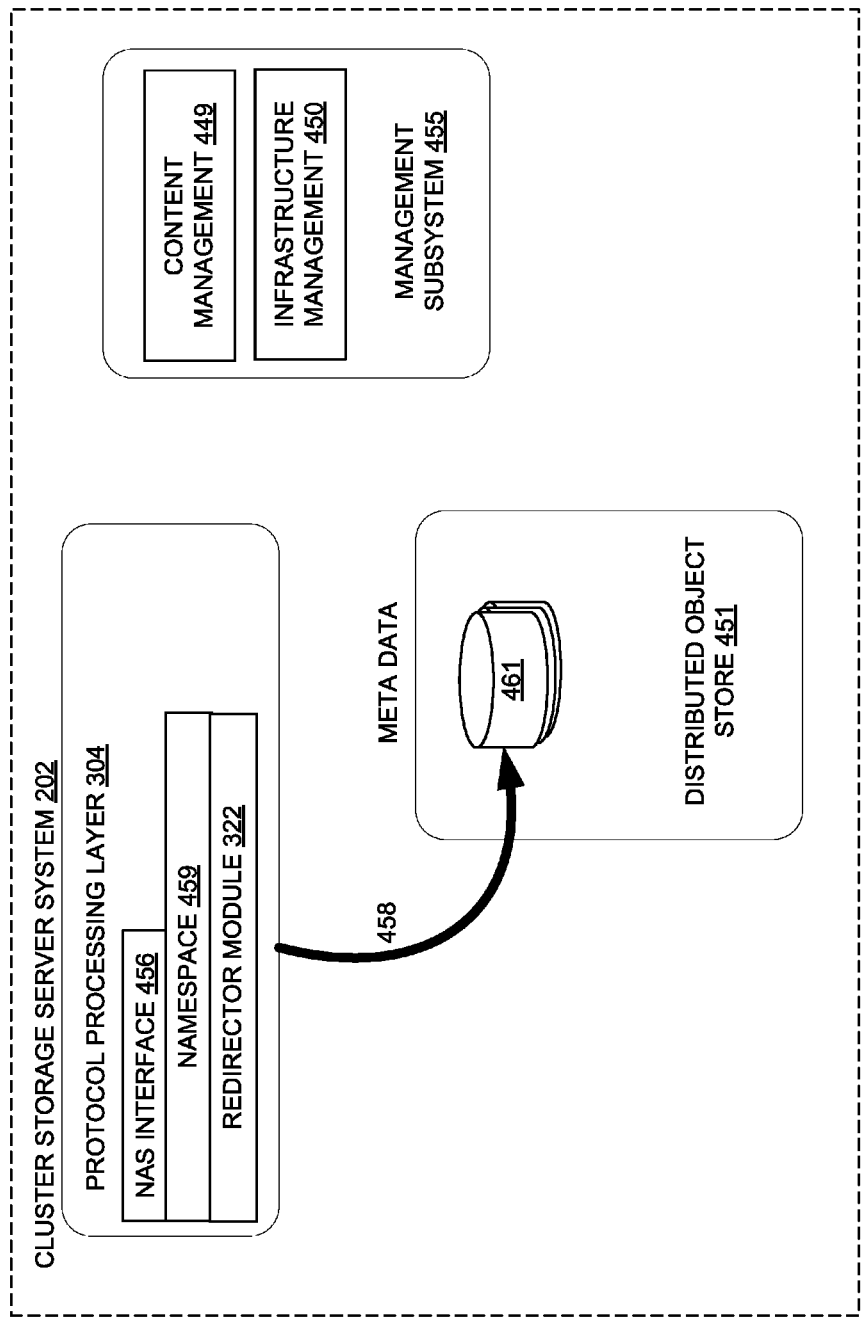
FIG. 4 is a block diagram illustrating an overall architecture of a content repository embodied in a clustered storage server system, according to one exemplary embodiment.

FIG. 4 is a block diagram illustrating an overall architecture of a content repository embodied in a clustered storage server system 202, according to one exemplary embodiment. Components of the content repository include a distributed object store 451, a protocol processing layer 304, and a management subsystem 455. A single instance of each of these components 451, 455, and 304, can exist in the overall content repository, and each of these components 451, 455, and 304 can be implemented in any one server node or distributed across two or more server nodes in a clustered storage server system 202.

The distributed object store 451 provides the actual data storage for all data objects in the clustered storage server system 202 and includes multiple distinct single-node object stores 461. A "single-node" object store is an object store that is implemented entirely within one node. Each single-node object includes a logical data container. Some or all of the single-node object stores 461 that make up the distributed object store 451 can be implemented in separate server nodes. Alternatively, all of the single-node object stores 461 that make up the distributed object store 451 can be implemented in the same server node. Any given server node can access multiple single-node object stores 461 and additionally, can itself include multiple single-node object stores 461.

The distributed object store 451 provides location-independent addressing of data objects with the ability to span the object address space across other similar systems spread over geographic distances. That is, data objects can be moved among single-node object stores 461 without changing the data objects' addressing. It should be noted that the distributed object store 451 has no namespace; the namespace for the clustered storage server system 202 is provided by the protocol processing layer 304.

The protocol processing layer 304 provides access 458 to the distributed object store 451 and essentially functions as a router, by receiving client requests, translating them into an internal protocol and sending them to the appropriate D-module. The protocol processing layer 304 provides two or more independent interfaces for accessing stored data (e.g., a conventional NAS interface 456). The NAS interface 456 allows access to the object store 451 via one or more conventional NAS protocols, such as NFS and/or CIFS. Thus, the NAS interface 456 provides a file system-like interface to the content repository. The NAS interface 456 allows access to data stored in the object store 451 by named object access, which uses a namespace 459. This namespace 459 is a file system-like directory-tree interface for accessing data objects. An example of a namespace 459 is a Portable Operating System Interface (POSIX) namespace.

The redirector module 322 in the protocol processing layer 304 generally provides a logical separation of directory entries and storage locations of stored data objects in the distributed object store 451. As described in detail below, the redirector module 322 can also provide the functionalities of identifying data objects stored on the distributed object store 451.

The management subsystem 455 includes a content management component 449 and an infrastructure management component 450. The infrastructure management component 450 includes logic to allow an administrative user to manage the storage infrastructure (e.g., configuration of nodes, disks, volumes, LUNs, etc.). The content management component 449 is a policy based data management subsystem for managing the lifecycle of data objects (and optionally the metadata) stored in the content repository, based on user-specified policies or policies derived from user-defined SLOs. It can execute actions to enforce defined policies in response to system-defined trigger events and/or user-defined trigger events (e.g., attempted creation, deletion, access, or migration of a data object). Trigger events do not have to be based on user actions. The specified policies may relate to, for example, system performance, data protection and data security. Performance related policies may relate to, for example, which logical container a given data object should be placed in, migrated from or to, when the data object should be migrated, deleted, or other file operations. Data protection policies may relate to, for example, data backup and/or data deletion. As used herein, a "policy" can be a set of specific rules regarding where to store what, when to migrate data, derived by the system from the end user's SLOs.

Figure 5:
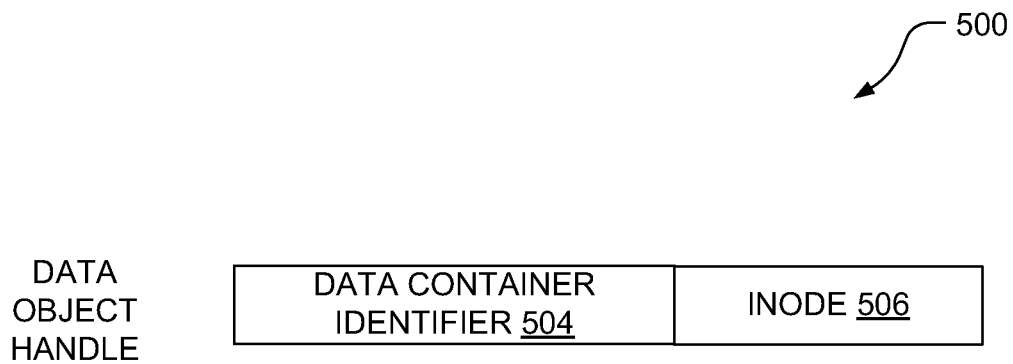
FIG. 5 is a block diagram of an exemplary embodiment of a data object handle.

Access to the distributed object store is based on the use of a data object handle, an example of which is illustrated in FIG. 5. This exemplary data object handle 500 includes a logical data container identifier 504 and an inode 506 on that data container. The logical data container identifier 504 is a value that uniquely identifies a logical data container. The inode 506 is a data structure used to store the metadata of one or more data containers. The inode 506 includes a set of pointers to blocks within a file system. For data objects, for example, the inode 506 may directly point to blocks storing the data objects.

Figure 6:
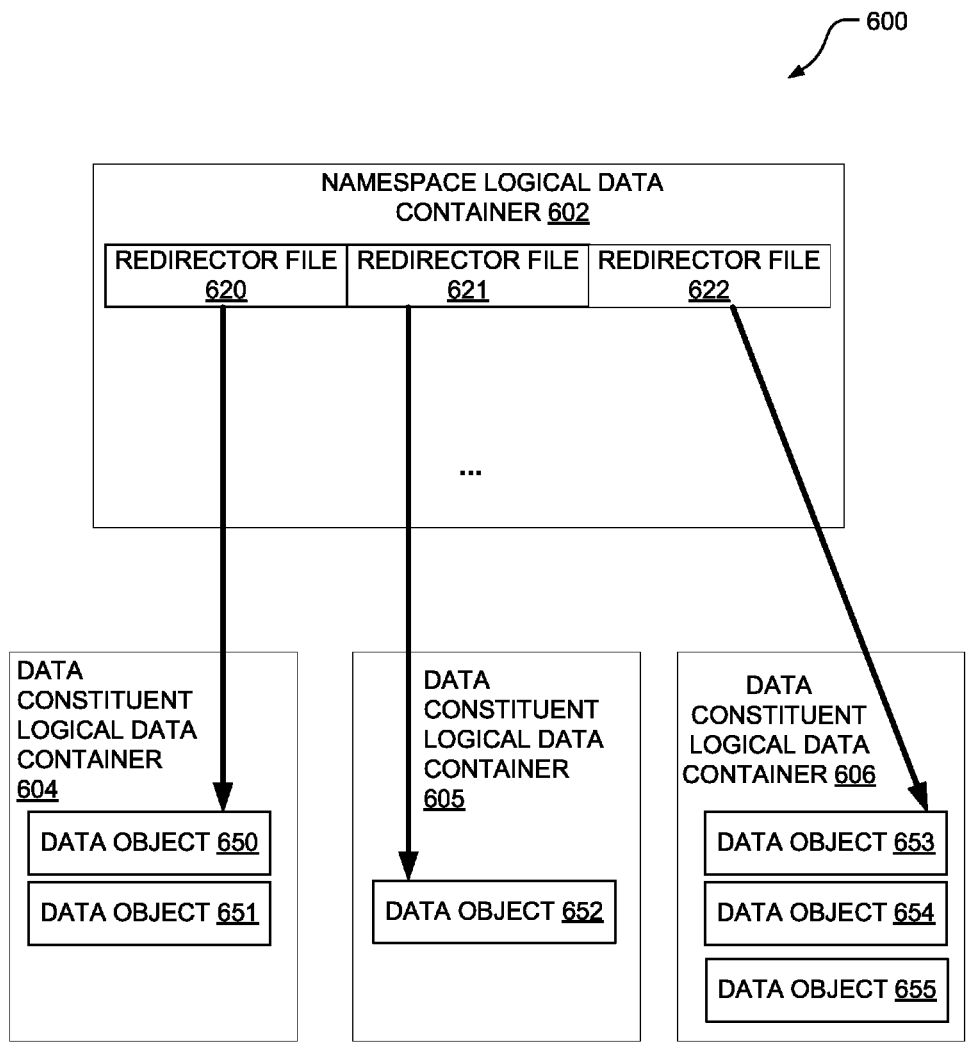
FIG. 6 is a block diagram depicting a system of logical data containers for referencing data objects stored in a cluster of logical data containers, in accordance with an exemplary embodiment of the present invention.

FIG. 6 is a block diagram depicting a system 600 of logical data containers 602 and 604-606 for referencing data objects stored in a cluster of logical data containers 604-606, in accordance with an exemplary embodiment of the present invention. The system 600 includes a logical data container 602 that is specifically configured to store data associated with a namespace. In other words, this logical data container 602 is not configured to store the actual data objects 650-655 being accessed by a client. As used herein, such a logical data container 602 is referred to as a "namespace logical data container." The system 600 also includes logical data containers 602 that are specifically configured to store data objects. In other words, the logical data containers 602 are not configured to store namespace data. As used herein, such a logical data container 604, 605, or 606 is referred to as a "data constituent logical data container."

Path names of data objects 650-655 in a storage server system are stored in association with a namespace (e.g., a directory namespace). The directory entry maintains a separate directory for each data object stored in a distributed object store. A directory entry, as indicated herein, refers to an entry that describes a name of any type of data object (e.g., directories, files, and logical data containers). Each directory entry includes a path name of the data object and a pointer for mapping the directory entry to the data object. In a traditional storage system, the pointer (e.g., an inode number) directly maps the path name to an inode associated with the data object. On the other hand, in the illustrated embodiment shown in FIG. 6, the pointer of each data object points to a redirector file 620, 621, or 622 associated with a data object 650, 651, 652, 653, or 655. A "redirector file," as indicated herein, refers to a file that maintains an object locator of the data object. The object locator of the data object can be a data object handle of the data object. In particular, from the perspective of a client, each data object handle points from the redirector file to a data object and thus, such a data object handle can be referred to as a "forward data object handle." In addition to the object locator data, each redirector file 620, 621, or 622 may also contain other data, such as metadata about a location of the redirector file. In the illustrated embodiment, the redirector files 620-622 are stored within the namespace logical data container 602.

When a client attempts to read or write a data object, the client includes a reference to a redirector file 620, 621, or 622 of the data object in its read or write request to the storage server system. The storage server system references the redirector file 620, 621, or 622 to the exact location within a data constituent logical data container where the data object is stored. In the example depicted in FIG. 6, a data object handle in redirector file 620 points to a data object 650 stored on data constituent logical data container 604. The data object handle in redirector file 621 points to a data object 652 stored on data constituent logical data container 604. The data object handle in redirector file 622 points to a data object 653 stored on data constituent logical data container 606.

By having the directory entry pointer of a data object point to a redirector file 620, 621, or 622 instead of pointing to an actual inode of the data object, the storage server system introduces a layer of indirection between (or provides a logical separation of) directory entries and storage locations of the stored data object. This separation facilitates transparent migration (e.g., a data object can be moved without affecting its name), and moreover, it enables any particular data object to be represented by multiple path names, thereby facilitating navigation. In particular, this allows the implementation of a hierarchical protocol such as NFS on top of an object store, while at the same time allowing access via a flat object address space (wherein clients directly use the global object ID to access objects) and maintaining the ability to do transparent migration.

In various embodiments, the system 600 of logical data containers may be exposed as a single logical data container. For example, the system 600 of logical data storage containers may be brought together to work cooperatively to present the illusion that they are a single logical data container that has a storage capacity that is in excess of a storage capacity of any one physical storage container (e.g., a disk), a redundant array of inexpensive disks (RAID) group, an aggregation of RAID groups, or a storage array of multiple aggregations of RAID groups. For example, the system 600 of logical data storage containers may be presented to an administrator for viewing and configuring as if it was a single logical data container of a file system.

Figure 7:
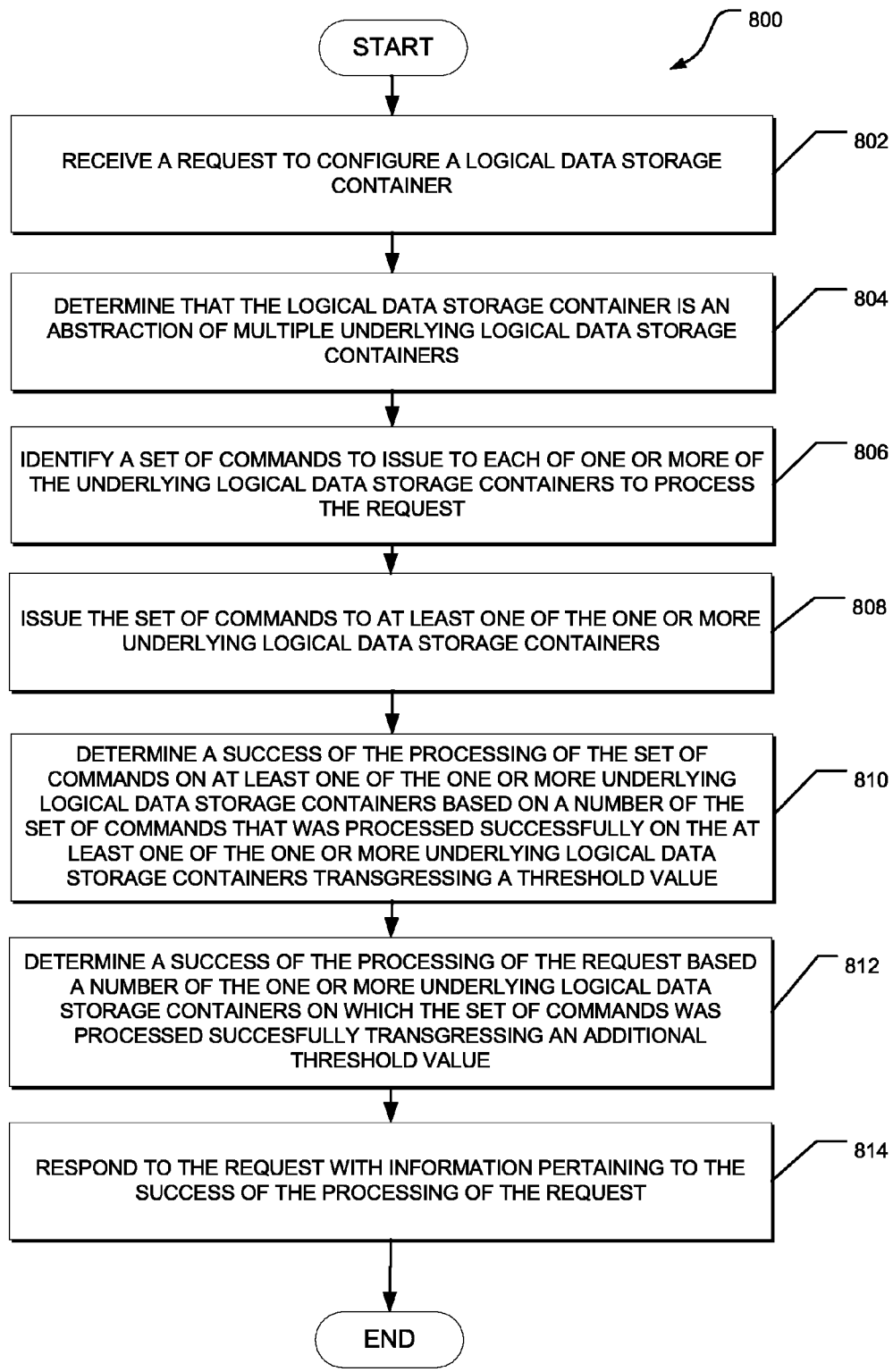
FIG. 7 is a flow diagram of a general overview of a method, in accordance with an exemplary embodiment of the present invention, for configuring a logical data storage container.

FIG. 7 depicts a flow diagram of a general overview of a method 800, in accordance with an exemplary embodiment of the present invention, for configuring a logical data container that is comprised of multiple underlying logical data containers (e.g., a namespace constituent and multiple data constituents). In an exemplary embodiment, the method 800 may be implemented by the redirector module 322 employed within a protocol processing layer, as discussed above.

At operation 802, the redirector module 322 receives a request to configure a logical data storage container. For example, the redirector module may receive a request entered by an administrator via the management subsystem 455 to add 100 TB to the logical data storage container. Or the redirector module 322 may receive a command to set permissions on the logical data storage container, activate or change features (e.g., enable or disable thin or thick-provisioning) of the logical data storage container, and so on. Thus, the request to configure the logical data storage container may include a request to modify any configurable attribute of the logical data storage container, such as its size.

At operation 804, the redirector module 322 determines that the logical data storage container is an abstraction of multiple underlying logical data storage containers. For example, the redirector module 322 may access a value of a type attribute of the logical data storage container. The type attribute may provide an indication of whether the logical data storage container is comprised of multiple underlying logical data storage containers.

At operation 806, the redirector module 322 identifies a set of commands that is to be issued to one or more of the multiple underlying logical data storage containers to process the request. For example, to process a request to add 100 TB of storage to the logical data storage container, the redirector module 322 may determine that three new underlying data constituents must be added to the current set of underlying data constituents of the logical data storage container. Additionally, the redirector module 322 may determine that the creating of each new underlying data constituent includes performing three steps: creating the underlying data constituent (e.g., calling a "create" command of the file system on the underlying data constituent), applying properties to the underlying data constituent (e.g., calling an "apply-properties" command of the file system on the underlying data constituent), and attaching the underlying data constituent to the logical data storage container (e.g., calling an "attach"

command of the file system on the underlying data constituent and the logical data constituent).

At operation 808, the redirector module 322 issues the set of commands identified at operation 806 to at least one of the one or more underlying data storage containers.

At operation 810, the redirector module 322 determines whether a set of commands is processed successfully on an underlying logical data storage container. For example, the redirector module 322 determines whether a number of the set of commands that is processed successfully on the underlying logical data storage container transgressing a threshold (e.g., a minor threshold) value. If a command is not completed successfully with respect to the underlying storage container, the redirector module may issue an additional command to the underlying storage container to backout the command or each of the set of commands, thus restoring the underlying logical data storage container to a stable, pre-command-processing state. Alternatively, the repository operations library may not backout the failed command in order to capture as much progress toward the completion of the processing of the request as possible.

In various embodiments, if the minor threshold is transgressed but not all of the set of commands are executed successfully on the underlying logical data storage container (that is, if the processing of the set of commands is treated as successful even though it is only partially successful), the redirector module 322 logs information pertaining to steps that may be executed later (e.g., manually by an administrator) to ensure that all of the set of commands are processed successfully with respect to the underlying data storage container. This information may be transmitted in the response to the request at operation 814, which is described below.

At operation 812, the redirector module 322 determines whether the command for configuring the logical data storage container was processed successfully based on a number of sets of commands that were completed successfully on the one or more underlying logical data storage containers transgressing an additional threshold (e.g., a major threshold) value.

At operation 814, the redirector module 322 responds to the request with information pertaining to the success of the processing of the request. For example, the redirector module 322 may send a notification of the status of the processing of the command on the logical data storage volume and information about additional commands that may be executed (e.g., manually by a user) to complete the requested configuration of the logical data storage container.

Figure 8:
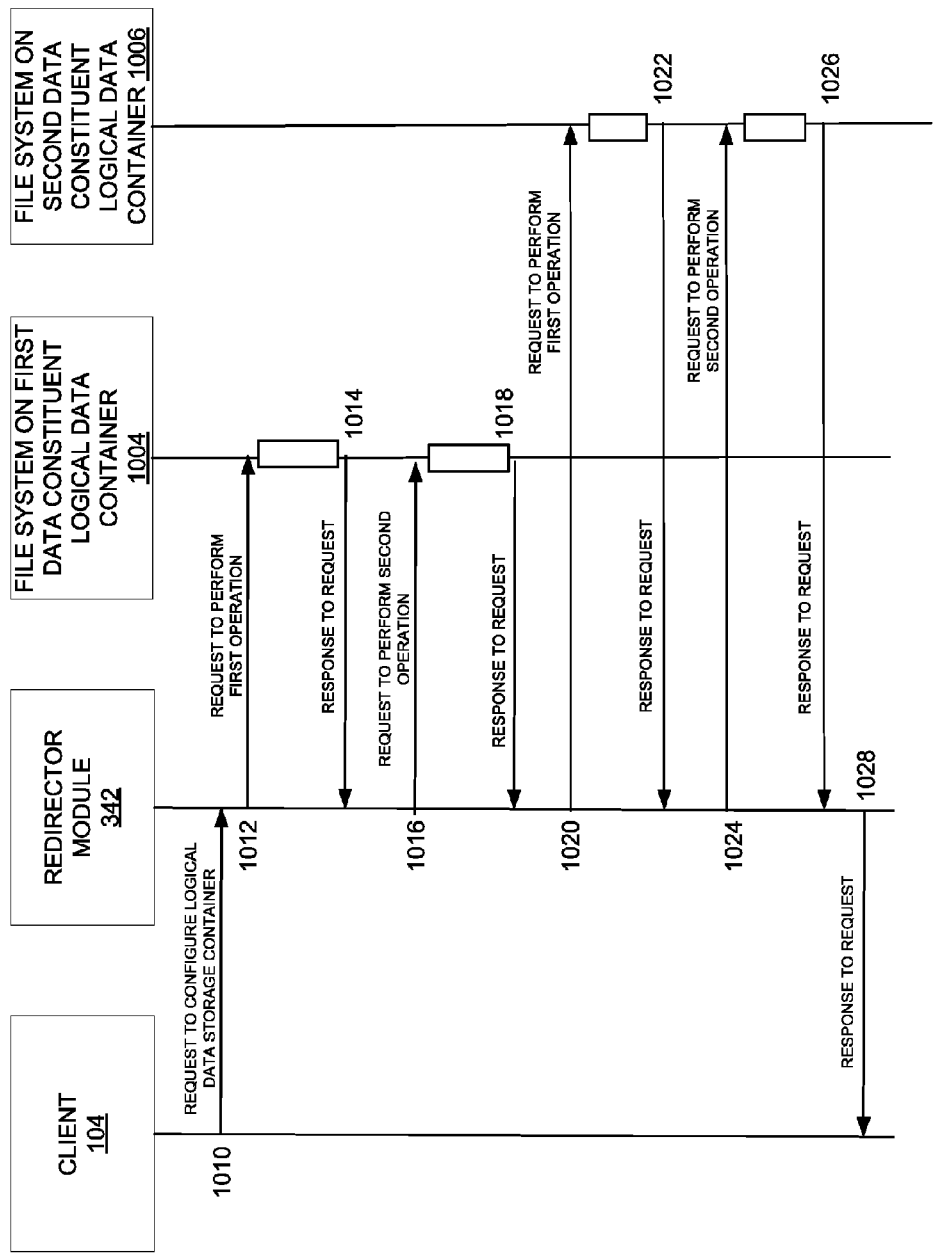
FIG. 8 is an interaction diagram illustrating the interactions between different components to create a backward data object handle, in accordance with an exemplary embodiment of the present invention.

FIG. 8 is an interaction diagram illustrating the interactions between different components to configure a logical data storage container in an exemplary embodiment of the present invention. This diagram depicts a system that includes a client 104, a redirector module 342, a file system 1004 on a first data constituent logical data container, and another file system 1006 on a second data constituent logical data container. In various embodiments, the redirector module 342 is identical or similar to the redirector module 322 described above.

Starting at 1010, the client 104 transmits a request to the redirector module 342. This request is to configure a logical data storage container comprised of the first data constituent logical data container 1004 and the second data constituent logical data container 1006. Upon receipt of the request, the redirector module 342 translates the instruction into two additional instructions that are to be transmitted to each of the first data constituent logical data container 1004 and the second data constituent logical data container 1006.

The redirector module 342 transmits, at 1012, a first of the two additional instructions as a request to the first data constituent logical data container 1004. At 1014, the first data constituent logical data container 1004 transmits a response to the first of the two additional instructions to the redirector module 342. The response may indicate a success or failure of a processing of the first of the two additional instructions by the first data constituent logical data container 1004.

The redirector module 342 transmits, at 1016, the second of the two additional instructions as a request to the first data constituent logical container 1004. At 1018, the first data constituent logical data container 1004 transmits a response to the request to perform the second of the two additional instructions to the redirector module 342. The response may indicate a success or failure of a processing of the second of the two additional instructions by the first data constituent logical data container 1004. Based on whether the responses received at 1014, 1018, or both from the first data constituent logical data container 1004 indicate a level of success that transgresses a threshold value (e.g., a minor threshold value), the redirector module 342 determines whether the instruction has been performed successfully with respect to the first data constituent logical data container 1004.

For example, a minor threshold value may indicate that an instruction has been performed successfully with respect to a data constituent logical data container if the data constituent logical data container successfully processes at least one of the two additional instructions successfully. In this case, the redirector module 342 may determine that the instruction was processed successfully by the first data constituent logical data container 1004 if either the first additional instruction or the second additional instruction was processed successfully by the first data constituent logical data container 1004. Or, if the two additional instructions are to be performed in sequential order, the redirector module 342 may determine that the instruction was processed successfully by the first data constituent logical data container 1004 only if the first of the two additional instructions was processed successfully by the first data constituent logical data container 1004.

In various embodiments, the redirector module 342 performs the transmitting at 1016 based on information received in the response to the request sent at 1014 (e.g., whether the first of the two additional instructions was processed successfully by the first data constituent logical data container 1004).

The redirector module 342 transmits, at 1020, the first of the two additional instructions as a request to the second data constituent logical data container 1006. At 1022, the second data constituent logical data container 1006 transmits a response to the first of the two additional instructions to the redirector module 342. The response may indicate a success or failure of a processing of the first of the two additional instructions by the second data constituent logical data container 1006.

At 1024, the redirector module 342 transmits the second of the two additional instructions as a request to the second data constituent logical container 1006. At 1026, the second data constituent logical data container 1006 transmits a response to the request to perform the second of the two additional instructions to the redirector module 342. The response may indicate a success or failure of a processing of the second of the two additional instructions by the second data constituent logical data container 1006. Based on whether the responses received at 1022, 1026, or both from the second data constituent logical data container 1006 indicate a level of success that transgresses a threshold value (e.g., a minor threshold value), the redirector module 342 determines whether the instruction has been performed successfully with respect to the second data constituent logical data container 1006. This determination may be same as or similar to the determination described above with respect to the first data constituent logical data container 1004.

In various embodiments, the redirector module 342 performs the transmitting at 1024 based on information received in the response to the request sent at 1022 (e.g., whether the first of the two additional instructions was processed successfully by the second data constituent logical data container 1006). In various embodiments, the redirector module 342 bases the determination of whether to transmit the requests at 1020, 1024, or both based on the determination, described above, of whether the instruction was processed successfully with respect to the first data constituent logical data container 1004.

At operation 1028, the redirector module 1028 determines whether the instruction to configure the logical data storage container was successful based on whether the responses to the requests 1018, 1026, or both transgress an additional threshold value (e.g., a major threshold value). For example, a major threshold value may indicate that an instruction must be performed successfully with respect to one of the two data constituent logical data containers that comprise the data storage container. In this case, the redirector module 342 may determine that the instruction was performed successfully with respect to the logical data storage container only if the instruction was performed successfully with respect to at least one of the first data constituent logical data container 1004 and the second data constituent logical data container 1006. Or, if each of the two additional instructions is to be performed in sequential order upon each of the two data constituent logical data containers 1004 and 1006, the redirector module 342 may determine that the instruction was performed successfully with respect to the logical data container only if the instruction was performed successfully with respect to at least the first data constituent logical data container 1004.

The redirector module 1028 may then send a response to the request to configure the logical data container. The response may include an indication of whether the instruction was performed successfully with respect to the logical data container. If the instruction was not completely performed on each of the underlying data constituent logical data containers 1004 and 1006 that comprise the logical data container, the redirector module 342 may include in the response information about steps that an administrator may perform to manually configure the logical data storage container such that the configuration change request embodied in the instruction transmitted at 1010 is fully achieved. The redirector module 342 may include in the response information about a level of success of the processing of the request to configure the logical data container. The level of success may be presented relative to the threshold value used to determine whether the instruction included in the request was performed successfully with respect to each of the data constituent logical data containers or the threshold value used to determine whether the instruction was performed successfully with respect to the logical data container that is comprised of each of the data constituent logical data containers.

In various embodiments, the threshold values described above may be specified by an administrator of the logical data container or the file system or storage system on which the logical data container is implemented.

Although not illustrated in FIG. 8, in various embodiments, the redirector module 1028 may send further instructions to each of the first data constituent logical data container or the second data constituent logical data container based on whether the request to configure the logical data storage container was processed successfully with respect to the first data constituent logical data container or the second data constituent logical data container, respectively (e.g., based on a minor threshold value). For example, if the request to configure the logical data storage is not processed successfully with respect to the first data constituent logical data container, the redirector module may send an instruction to the first data constituent logical data container to backout one or more of the additional instructions that were executed successfully with respect to first data constituent logical data container, thereby returning the state of the first data constituent logical data container to its state prior to the processing of the additional instructions.

In various embodiments, even upon a failure of the request to configure the logical data storage container to be processed successfully (e.g., based on a comparison of a level of success of the processing with respect to a major threshold value), the redirector module 342 does not attempt to reverse any progress made at the data constituent logical data container level toward completion of the processing of the request. In this way, the redirector module 342 may enable any gains captured toward the completion of the processing of the request to be maintained.

Figure 9:
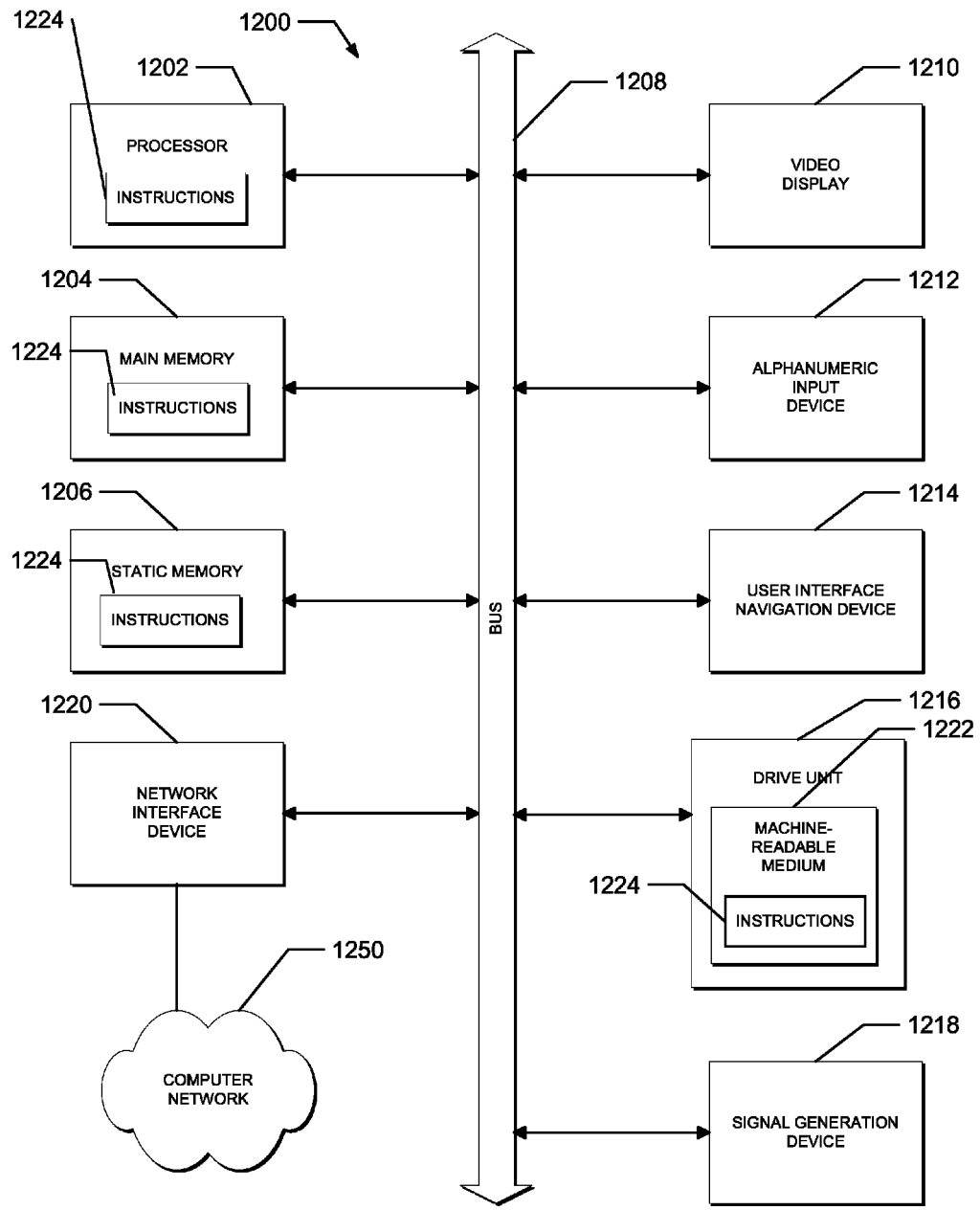
FIG. 9 depicts a hardware block diagram of a machine in the example form of a processing system within which may

FIG. 9 depicts a hardware block diagram of a machine in the example form of a processing system 1200 (e.g., a storage server system) within which may be executed a set of instructions for causing the machine to perform any one or more of the methodologies discussed herein. In alternative embodiments, the machine operates as a standalone device or may be connected (e.g., networked) to other machines. In a networked deployment, the machine may operate in the capacity of a server or as a peer machine in a peer-to-peer (or distributed) network environment.

The machine is capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example of the processing system 1200 includes a processor 1202 (e.g., a central processing unit (CPU), a graphics processing unit (GPU) or both), a main memory 1204 (e.g., random access memory), and static memory 1206 (e.g., static random-access memory), which communicate with each other via bus 1208. The processing system 1200 may further include video display unit 1210 (e.g., a plasma display, a liquid crystal display (LCD) or a cathode ray tube (CRT)). The processing system 1200 also includes an alphanumeric input device 1212 (e.g., a keyboard), a user interface (UI) navigation device 1214 (e.g., a mouse), a disk drive unit 1216, a signal generation device 1218 (e.g., a speaker), and a network interface device 1220.

The disk drive unit 1216 (a type of non-volatile memory storage) includes a machine-readable medium 1222 on which is stored one or more sets of data structures and instructions 1224 (e.g., software) embodying or utilized by any one or more of the methodologies or functions described herein. The data structures and instructions 1224 may also reside, completely or at least partially, within the main memory 1204 and/or within the processor 1202 during execution thereof by processing system 1200, with the main memory 1204 and processor 1202 also constituting machine-readable, tangible media.

The data structures and instructions 1224 may further be transmitted or received over a computer network 3 via network interface device 1220 utilizing any one of a number of well-known transfer protocols (e.g., HyperText Transfer Protocol (HTTP)).

Certain embodiments are described herein as including logic or a number of components, modules, or mechanisms. Modules may constitute software modules (e.g., code embodied on a machine-readable medium or in a transmission signal) and/or hardware modules. A hardware module is a tangible unit capable of performing certain operations and may be configured or arranged in a certain manner. In example embodiments, one or more computer systems (e.g., the processing system 1200) or one or more hardware modules of a computer system (e.g., a processor 1202 or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor 1202 or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor 1202 configured using software, the general-purpose processor 1202 may be configured as respective different hardware modules at different times. Software may accordingly configure a processor 1202, for example, to constitute a particular hardware module at one instance of time and to constitute a different hardware module at a different instance of time.

Modules can provide information to, and receive information from, other modules. For example, the described modules may be regarded as being communicatively coupled. Where multiples of such hardware modules exist contemporaneously, communications may be achieved through signal transmission (e.g., over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation, and store the output of that operation in a memory device to which it is communicatively coupled. A further module may then, at a later time, access the memory device to retrieve and process the stored output. Modules may also initiate communications with input or output devices, and can operate on a resource (e.g., a collection of information).

The various operations of example methods described herein may be performed, at least partially, by one or more processors 1202 that are temporarily configured (e.g., by software) or permanently configured to perform the relevant operations. Whether temporarily or permanently configured, such processors 1202 may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors 1202 or processor-implemented modules. The performance of certain of the operations may be distributed among the one or more processors 1202, not only residing within a single machine, but deployed across a number of machines. In some example embodiments, the processors 1202 may be located in a single location (e.g., within a home environment, an office environment or as a server farm), while in other embodiments the processors 1202 may be distributed across a number of locations.

While the embodiment(s) is (are) described with reference to various implementations and exploitations, it will be understood that these embodiments are illustrative and that the scope of the embodiment(s) is not limited to them. In general, techniques for identification of data objects may be implemented with facilities consistent with any hardware system or hardware systems defined herein. Many variations, modifications, additions, and improvements are possible.

Plural instances may be provided for components, operations or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the embodiment(s). In general, structures and functionality presented as separate components in the exemplary configurations may be implemented as a combined structure or component. Similarly, structures and functionality presented as a single component may be implemented as separate components. These and other variations, modifications, additions, and improvements fall within the scope of the embodiment(s).

What is claimed is:

1. A method of configuring a data storage system, the method comprising:
   receiving an instruction to perform an operation to modify an attribute of a logical data storage container, the logical data storage container comprising a set of underlying storage containers;
   transmitting, to each of a plurality of underlying storage containers of the set of underlying storage containers, a translated instruction to perform a sub-operation associated with the operation;
   detecting, for each of the plurality of underlying storage containers, a level of success in performing the corresponding sub-operation based on a comparison of a first threshold value to a number of steps of the corresponding sub-operation that are successfully processed by that underlying storage container, wherein the level of success in performing the corresponding sub-operation is deemed a partial success when one or more of the steps fails and the number of steps of the corresponding sub-operation meets or exceeds the first threshold value;
   detecting a level of success in performing the operation to modify the attribute of the logical data storage container based on a comparison of a second threshold value to the levels of successes in performing the sub-operations by the plurality of underlying storage containers; and communicating a report of the level of the success in performing the operation to modify the attribute of the logical data storage container, the report including the partial successes and the one or more failed steps.

2. The method of claim 1, wherein receiving the instruction to perform the operation to modify the attribute of the logical data storage container includes receiving the instruction from a client device, and wherein the operation includes (i) adjusting a size of the logical data storage container, (ii) adjusting one or more permissions on the logical data storage container, or (iii) enabling or disabling thin or thick-provisioning of the logical data storage container.

3. The method of claim 1, further comprising:
including, in the report, information about one or more commands to be executed on at least one of the plurality of underlying storage containers to change the level of success in processing the sub-operation on the at least one of the plurality of underlying storage containers from less than complete success to complete success.

4. The method of claim 1, further comprising:
determining, for each of the plurality of underlying storage containers, the steps of the sub-operation to be processed by that underlying storage container based on information about that underlying storage container and information about the operation to modify the attribute of the logical data storage container.

5. The method of claim 1, further comprising:
determining that the logical data storage container is comprised of the set of underlying storage containers by accessing of a value of a type attribute of the logical data storage container.

6. The method of claim 1, further comprising:
rolling back at least one step of a sub-operation on at least one of the plurality of underlying storage containers based on the level of success in performing the sub-operation on the at least one of the plurality of underlying storage containers falling short of partial success.

7. A system, comprising:
at least one processor; and
a memory, coupled to the at least one processor, storing instructions that, when executed by the at least one processor, causes the system to perform operations comprising:
receiving a request to perform an operation to modify an attribute of a logical data storage container, the logical data storage container comprising a set of underlying storage containers;
transmitting, to each of a plurality of underlying storage containers of the set of underlying storage containers, a translated instruction to perform a sub-operation associated with the operation;
detecting, for each of the plurality of underlying storage containers, a level of success in performing the corresponding sub-operation based on a comparison of a first threshold value to a number of steps of the corresponding sub-operation that are successfully processed by that underlying storage container, wherein the level of success in performing the corresponding sub-operation is deemed a partial success when one or more of the steps fails and the number of steps of the corresponding sub-operation meets or exceeds the first threshold value;
detecting a level of success in performing the operation to modify the attribute of the logical data storage container based on a comparison of a second threshold value to the levels of successes in performing the sub-operations by the plurality of underlying storage containers; and communicating a report of the level of the success in performing the operation to modify the attribute of the logical data storage container, the report including the partial successes and the one or more failed steps.

8. The system of claim 7, wherein the instructions cause the system to receive the request to perform the operation to modify the attribute of the logical data storage container from a client device, and wherein the operation includes (i) adjusting a size of the logical data storage container, (ii) adjusting one or more permissions on the logical data storage container, or (iii) enabling or disabling thin or thick-provisioning of the logical data storage container.

9. The system of claim 7, wherein the instructions cause the system to further perform operations comprising:
including, in the report, information about one or more commands to be executed on at least one of the plurality of underlying storage containers to change the level of success in processing the sub-operation on the at least one of the plurality of underlying storage containers from less than complete success to complete success.

10. The system of claim 7, wherein the instructions cause the system to further perform operations comprising:
determining, for each of the plurality of underlying storage containers, the steps of the sub-operation to be processed by that underlying storage container based on information about that underlying storage container and information about the operation to modify the attribute of the logical data storage container.

11. The system of claim 7, wherein the instructions cause the system to further perform operations comprising:
determining that the logical data storage container is comprised of the set of underlying storage containers by accessing of a value of a type attribute of the logical data storage container.

12. The system of claim 7, wherein the instructions cause the system further perform operations comprising:
rolling back at least one step of a sub-operation on at least one of the plurality of underlying storage containers based on the level of success in performing the sub-operation on the at least one of the plurality of underlying storage containers falling short of partial success.

13. A non-transitory machine readable medium storing instructions that, when executed by a processor of a storage system, causes the storage system to perform operations comprising:
receiving a request to perform an operation to modify an attribute of a logical data storage container, the logical data storage container comprising a set of underlying storage containers;
transmitting, to each of a plurality of underlying storage containers of the set of underlying storage containers, a translated instruction to perform a sub-operation associated with the operation;
detecting, for each of the plurality of underlying storage containers, a level of success in performing the corresponding sub-operation based on a comparison of a first threshold value to a number of steps of the corresponding sub-operation that are successfully processed by that underlying storage container, wherein the level of success in performing the corresponding sub-operation is deemed a partial success when one or more of the steps fails and the number of steps of the corresponding sub-operation meets or exceeds the first threshold value;

detecting a level of success in performing the operation to modify the attribute of the logical data storage container based on a comparison of a second threshold value to the levels of successes in performing the sub-operations by the plurality of underlying storage containers; and communicating a report of the level of the success in performing the operation to modify the attribute of the logical data storage container, the report including the partial successes and the one or more failed steps.

14. The non-transitory machine readable medium of claim 13, wherein the instructions cause the storage system to receive the request to perform the operation to modify the attribute of the logical data storage container from a client device, and wherein the operation includes (i) adjusting a size of the logical data storage container, (ii) adjusting one or more permissions on the logical data storage container, or (iii) enabling or disabling thin or thick-provisioning of the logical data storage container.

15. The non-transitory machine readable medium of claim 13, wherein the instructions cause the storage system to further perform operations comprising:

including, in the report, information about one or more commands to be executed on at least one of the plurality of underlying storage containers to change the level of success in processing the sub-operation on the at least one of the plurality of underlying storage containers from less than complete success to complete success.

16. The non-transitory machine readable medium of claim 13, wherein the instructions cause the storage system to further perform operations comprising:

determining, for each of the plurality of underlying storage containers, the steps of the sub-operation to be processed by that underlying storage container based on information about that underlying storage container and information about the operation to modify the attribute of the logical data storage container.

17. The non-transitory machine readable medium of claim 13, wherein the instructions cause the storage system to further perform operations comprising:

determining that the logical data storage container is comprised of the set of underlying storage containers by accessing of a value of a type attribute of the logical data storage container.

18. The non-transitory machine readable medium of claim 13, wherein the instructions cause the storage system to further perform operations comprising:

rolling back at least one step of a sub-operation on at least one of the plurality of underlying storage containers based on the level of success in performing the sub-operation on the at least one of the plurality of underlying storage containers falling short of partial success.

* * * * *